May 7, 1946.  A. KRÜSSMANN  2,399,872

ELECTRICALLY OPERATING REGULATING DEVICE

Filed Oct. 24, 1940

Inventor
Adolf Krüssman
by: [signature]
Attorney

Patented May 7, 1946

2,399,872

UNITED STATES PATENT OFFICE 2,399,872

ELECTRICALLY OPERATING REGULATING DEVICE

Adolf Krüssmann, Berlin-Wilmersdorf, Germany; vested in the Alien Property Custodian Application October 24, 1940, Serial No. 362,655
In Germany October 31, 1939

4 Claims. (Cl. 172—239)

The invention relates to an electrically operating regulating device in which a two-phase motor, preferably a Ferraris motor, serves to adjust the regulating member (throttle, valve or the like), the control current of said motor being controlled by means of a relay in response to a regulating impulse acting thereupon. In the application Ser. No. 293,524 it is explained what advantages result in the use of Ferraris motors for regulating purposes. More particularly the invention relates to a regulating device of the aforementioned structure in which the two-phase motor with its control winding is connected to a diagonal branch of an A. C. fed resistance bridge, which is unbalanced by any deviation of the actual regulating value from the desired regulating value. To this end a potentiometric resistance connected to one diagonal bridge branch and controlled by the regulating impulse—preferably an electrolyte potentiometer—may serve as relay. Consequently upon a deviation of the actual regulating value from the desired regulating value, the A. C. voltages at the potentiometric resistance, which balance at the desired regulating value, are varied in opposite senses with the result that an A. C. flows in the control winding of the two-phase motor, the amplitude and phase of which current corresponds to the value and direction of the deviation of the actual value from the desired value.

For some purposes, as for instance for remote-control, it may be necessary to keep the potentiometer dimensions small, which calls for a reliable amplifier. According to the invention, in the above mentioned arrangement, which provides the control winding of the two-phase motor in one diagonal branch of an A. C. fed bridge, two saturable inductances magnetically biased by direct current form the A. C. resistances in the one bridge branch, the biasing currents of which are variable in opposite sense in dependence on the regulating impulse.

Figure 1:
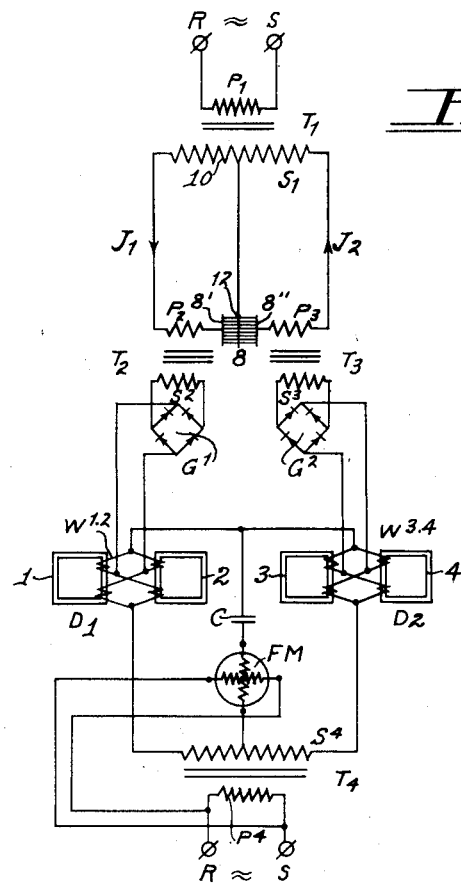
Figure 2:
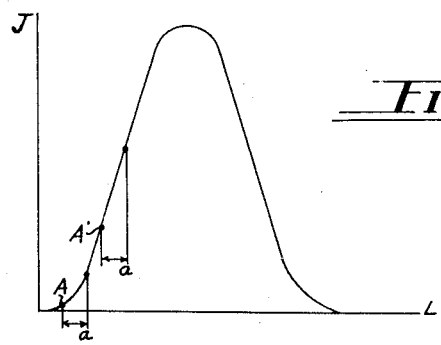

The subject matter of the invention is explained in greater detail with reference to the accompanying drawing, of which Fig. 1 represents a diagrammatic view of an arrangement according to the invention, and Fig. 2 a diagram showing a resonant characteristic obtained by using a biased saturable inductance.

The liquid potentiometer 8 (Fig. 1) having outer electrodes 8', 8" and a movably mounted middle electrode 12 is series connected with primary windings $P_2$, $P_3$, respectively, of two transformers $T_2$, $T_3$ being alike in construction and arranged on either side of the potentiometer, to the secondary winding $S_1$ of a transformer $T_1$ fed from the A. C. network RS. The middle electrode 12 of the potentiometer 8 is electrically connected to a center tap 10 of the secondary winding $S_1$ and controlled by an impulse transmitter of any kind (not shown). The secondary windings $S_2$, $S_3$ of the transformers $T_2$, $T_3$ are connected to the input terminals of the full wave rectifiers $G_1$, $G_2$, the output terminals of which deliver the current for magnetically biasing the saturable inductances $D_1$, $D_2$ which act as amplifiers. Each of the inductances $D_1$, $D_2$ possesses two two-legged cores 1, 2 and 3, 4, respectively, which carry A. C. winding $W_1$, $W_2$ and $W_3$, $W_4$ respectively, simultaneously serving for direct current biasing. Such amplifying devices are based on the principle of influencing the self-induction of an A. C. fed induction coil by a D. C. bias. Each winding is in known manner so arranged as to form a bridge, the rectifier output terminals being connected to one of the diagonal branches. On the other hand the other of the diagonal branches together with the secondary winding $S_4$ of a transformer $T_4$ fed from the A. C. network RS form a bridge, in whose diagonal branch are series connected one field winding of a Ferraris motor FM, preferably of the drum type, the other motor field winding being fed by the network RS, and a condenser C, the latter effecting the phase displacement of the two fields required to drive the Ferraris motor.

Currents $J_1$ and $J_2$ flowing in the two respective potentiometer bridge branches are of equal value in the middle position of the middle electrode 12 of the potentiometer 8. Consequently the two saturable inductances $D_1$ and $D_2$ are equally saturated by D. C. so that their self-induction is likewise equal. Hence the bridge, to whose diagonal branch the Ferraris motor is connected, is balanced. At a displacement of the center electrode 12 of the potentiometer 8 the one of the inductances $D_1$, $D_2$ is more strongly biased and simultaneously the other inductance is less strongly biased. In consequence the ratio of self-induction of $D_1$ and $D_2$ varies, and the bridge will be unbalanced so that the Ferraris motor due to the differential current in the diagonal branch of the bridge runs in the corresponding rotary direction and at corresponding speed. The arrangement in addition possesses the advantage of a rectilinear regulating characteristic, as the currents $J_1$ and $J_2$ are linearly dependent of the resistance ratio of the potentiometer.

Saturable A. C. fed inductances having a variable D. C. bias are of unlimited durability and possess small dimensions. The special advantage of the arrangement according to the invention consists in the possibility of effecting a control of the Ferraris motor as to speed and direction of rotation by means of only two amplifying devices.

The D. C. for magnetically biasing the saturable inductances are advantageously produced by using an A. C. fed potentiometric resistance controlled by the regulating impulse and connecting each of the two A. C. voltage drops occurring at the potentiometer taps to a rectifier, the output terminals of which supply the direct currents for biasing the two amplifying devices. This arrangement affords the advantage that A. C. voltages in the zero range may be more easily governed by a relay control member subjected to only slight control forces than is the case in direct control of D. C. voltages.

The condenser C above described serves an additional purpose. As is known, the series connection of a capacitor and an inductance is in resonance with the net frequency, provided the two A. C. resistances are of equal value. In this case the resistance of the circuit is equal to its ohmic resistance and the current has reached its greatest intensity. If the ratio of the capacitative and the inductive resistances relative to one another is varied, the resonance becomes impaired and the current is reduced on both sides of the point of resonance. If therefore the capacity C is maintained constant while the self-induction L of the amplifier is varied, a current $I = f(L)$ results, as shown in Fig. 2. It is now possible to choose the initial self-induction of the amplifiers so as to work on a certain portion of the curve in the course of the operative changes of the inductances, i. e. the steepness of the regulating characteristic may be adjusted. This characteristic will accordingly vary corresponding to whether the point A or the point A' is chosen as starting point, these points lying in curve sections of different steepness. The variation in self-induction is designated by $a$, which corresponds to a certain displacement of the potentiometer center electrode. By proceeding in the manner described a slight change in inductance of the amplifiers will not only cause a great variation in the controlling current for the Ferraris motor but the steepness at which the current variation occurs can best be adapted to the respective requirements.

What I claim is:

1. A motor control system comprising an alternating current power source having first and second terminals and a center tap, a motor, a first winding on said motor connected across said power source terminals, a second winding on said motor having a pair of terminals, one of said motor winding terminals being connected to said center tap, two pairs of iron cores; two windings on each of the cores, a pair of bridge networks comprised of the four windings on each pair of cores, means connecting one apex of one of the bridge networks to said first power source terminal, means connecting one apex of the other of the bridge networks to said second power source terminal, means operatively connecting the opposing apex of each of the bridge networks to the other of said motor winding terminals to complete the circuits thereto, phase shifting means in series with one of said motor windings, and adjustable direct current supply means connected across the remaining pairs of apices of said bridge networks.

2. A motor control system as claimed in claim 1, in which the phase shifting means is a condenser connected in series with said second motor winding, said direct current supply means being adjusted to initially maintain the inductance of said bridge networks at a value such that the circuits including the second motor winding are out of resonance with the alternating current power source.

3. A motor control system comprising an alternating current power source having first and second terminals and a center tap, a motor, a first winding on said motor connected across said power source terminals, a second winding on said motor having a pair of terminals, one of said motor winding terminals being connected to said center tap, two pairs of iron cores, a first and a second winding on one of the cores of each pair, a third and a fourth winding on the other of the cores of each pair, means connecting each of said first and third windings of each pair of cores in a series circuit with one of said remaining windings on the same pair of cores, means for connecting the series circuits of each pair of cores in parallel with each other to said other motor terminal and to one of said first and second power source terminals respectively to complete the circuits to said second motor winding, phase shifting means in series with one of said motor windings, means connecting said first and third windings of each pair of cores in series to an adjustable direct current supply means, and means connecting said second and fourth windings of each pair of cores in series to the same supply means as said first and third windings.

4. A motor control system as claimed in claim 3, in which the phase shifting means is a condenser connected in series with said second motor winding, said direct current supply means being adjusted to initially maintain the inductance of the core windings at a value such that the circuits including the second motor winding are out of resonance with the alternating current power source.

ADOLF KRÜSSMANN.